United States Patent [19]
Workman et al.

[11] Patent Number: 5,790,472
[45] Date of Patent: Aug. 4, 1998

[54] ADAPTIVE CONTROL OF MARINE SEISMIC STREAMERS

[75] Inventors: Ricky L. Workman; Ronald Edward Chambers, both of Houston, Tex.

[73] Assignee: Western Atlas International, Inc., Houston, Tex.

[21] Appl. No.: 771,049

[22] Filed: Dec. 20, 1996

[51] Int. Cl.$^6$ .................................................. G01V 1/38
[52] U.S. Cl. ...................................... 367/19; 367/16
[58] Field of Search .......................... 367/16, 19, 20, 367/106, 130, 17; 114/253

[56] References Cited

U.S. PATENT DOCUMENTS

| | | | |
|---|---|---|---|
| 3,931,608 | 1/1976 | Cole | 340/7 PC |
| 4,033,278 | 7/1977 | Waters | 144/245 |
| 4,087,780 | 5/1978 | Itria et al. | 340/7 |
| 4,187,492 | 2/1980 | Delignieres | 367/19 |
| 4,404,664 | 9/1983 | Zachariadis | 367/19 |
| 4,463,701 | 8/1984 | Pickett et al. | 114/245 |
| 4,729,333 | 3/1988 | Kirby et al. | 114/244 |
| 4,809,005 | 2/1989 | Counselman | 342/352 |
| 4,890,568 | 1/1990 | Dolengowski | 114/246 |
| 4,912,682 | 3/1990 | Norton, Jr. et al. | 367/19 |
| 5,031,159 | 7/1991 | Rouquette | 367/130 |
| 5,353,223 | 10/1994 | Norton et al. | 364/421 |
| 5,443,027 | 8/1995 | Owsley et al. | 114/244 |
| 5,532,975 | 7/1996 | Elholm | 367/16 |

OTHER PUBLICATIONS

M. Schoenberger and J. F. Misfud, "Hydrophone Streamer Noise", Geophysics, vol. 39, No. 6, pp. 781–793.
Franklyn K. Levin in "Short Note: The Effect of Binning on Data from a Feathered Streamer", Geophysics, vol. 49, No. 8, pp. 1386–1387.
Mamdouh R. Gadallah, "Reservoir Seismology", Pennwell, 1994, pp. 209–237.
Manin et al., "Recent Developments in Source and Streamer Positioning" First Break, vol. 6, pp. 183–188, Jun. 1981.

*Primary Examiner*—Ian J. Lobo
*Attorney, Agent, or Firm*—James Randall Allen; Charles R. Schweppe

[57] ABSTRACT

A method for controlling the position and shape of marine seismic streamer cables, whereby a plurality of real time signals from a marine seismic data acquisition system and a plurality of threshold parameters from an input device are received. The real time signals are compared to the threshold parameters to determine if the streamer cables should be repositioned. The streamer cables are repositioned when the real time signals exceed the threshold parameters.

10 Claims, 3 Drawing Sheets

ADAPTIVE CONTROL OF MARINE SEISMIC STREAMERS

BACKGROUND OF THE INVENTION

1. Field of the Invention

The present invention generally relates to an improved system for controlling the position and shape of marine seismic streamers.

2. Description of the Related Art

During a typical marine seismic survey a seismic vessel traverses programmed tracks towing arrays of seismic sources and seismic streamer cables. A seismic streamer cable normally contains a plurality of hydrophones which convert seismic pressure waves, initiated by the sources and reflected from the subsurface geologic formations, into electrical signals which are recorded on a marine seismic data acquisition system located on the vessel. Due to the increasing use of marine 3-D seismic data, multi-cable marine surveys are now commonplace. During a typical marine 3-D seismic survey, a vessel may tow as many as ten streamer cables, each cable ranging in length between three to eight kilometers. As reported by Gadallah in "Reservoir Seismology" 1994, pp. 209–237, the goal of a normal marine 3-D seismic survey is to use these arrays of seismic sources and streamer cables to record a highly sampled grid of "bins" of subsurface seismic coverage.

A natural consequence of towing such streamer cable configurations in a marine environment is that currents, wind, and wave action will deflect the streamer cables from their intended paths. Streamer cable drift is a continuing problem for marine seismic surveys. See, for example, U.S. Pat. No. 5,532,975. The ability to control the position and shape of the streamer cables is desirable for preventing the entanglement of the streamer cables and for avoiding collisions with offshore hazards such as marine drilling rigs and platforms. It is also desirable to have the ability to control the position and shape of the streamer cables during marine 3-D seismic surveys because the 3-D seismic binning process acquires subsurface seismic coverage by combining seismic data from different lines. The need for this ability is taught by Franklyn K. Levin in "Short Note: The effect of binning on data from a feathered streamer," Geophysics, Vol. 49, No. 8, pp. 1386–1387.

Streamer positioning devices are well known in the art. Apparatus, such as those disclosed in U.S. Pat. Nos. 5,532,975, 4,729,333, and 4,463,701, have been devised for attachment to the front end of streamer cables for the purpose of maintaining them at a lateral offset to the pathway of the towing vessel. Steerable tail buoys, as described in U.S. Pat. No. 4,890,568, have also been designed for controlling the position of the tail end of towed seismic streamer cables. The prior art also discloses streamer positioning devices that may be attached externally to the streamer cables. For example, devices to control the lateral positioning of streamer cables by using camber-adjustable hydrofoils or angled wings are disclosed in U.S. Pat. Nos. 4,033,278 and 5,443,027. U.S. Pat No. 3,931,608 describes an apparatus, typically known as a "bird", to control the vertical positioning of streamer cables with diving planes and a preset depth control means.

The use of streamer positioning devices comes at the price of introducing increased noise onto the seismic streamer and hence into the hydrophones. The areas of greatest noise are from those hydrophones which are adjacent to externally attached streamer positioning devices, such as depth controlling birds. This problem has been described by Schoenberger and Misfud, "Hydrophone Streamer Noise" Geophysics, Vol. 39, No. 6, pp. 782–784. It is well known in the art that noise limits the resolution of a seismic survey. Consequently, a maximum allowable hydrophone noise level is typically established for each marine seismic surveying project. When this noise level is exceeded, seismic acquisition is usually suspended, resulting in lost time and additional cost. Data acquired under such conditions may need to be reshot.

Location sensing devices and methods for determining the positions of the seismic sources and seismic streamer cables are also well known in the art. For example, both a Global Positioning System, as described in U.S. Pat. No. 4,809,005, and a network of acoustic elements, as described in U.S. Pat. No. 4,912,682 may be deployed on the vessel, streamer cables, and tail buoy. These devices and methods may then be used to determine the real time position of the seismic sources and seismic streamer cables by computing a network solution to a Kalman filter, as disclosed by U.S. Pat. No. 5,353,223.

As is known to those familiar with the art of marine seismic surveying, during a typical survey a human operator monitors the survey's operational conditions, such as the extent of the subsurface seismic coverage, the adequacy of the separations between streamer cables, and the proximity of the streamer cables to obstructive hazards. When these conditions indicate the need to reposition the streamer cables, the operator may manually issue commands to the various individual streamer positioning devices in order to adjust the position and shape of the streamer cable, or order the helmsman to redirect the vessel, or suspend data acquisition.

While the prior art discloses a series of discrete devices for locating and controlling the positions of streamer cables, it does not teach any method or system wherein these individual devices are unified into a single system for controlling the position and shape of marine seismic streamer cables. Also, the prior art fails to disclose any method or system wherein the real time hydrophone noise on the streamer cables operates as a constraint on the control of the position and shape of marine seismic streamer cables.

The present invention overcomes the limitations of the prior art by providing an improved system for controlling the position and shape of marine seismic streamer cables.

SUMMARY OF THE INVENTION

The present invention is an improved system for controlling the position and shape of marine seismic streamer cables. First, a plurality of real time signals from a marine seismic data acquisition system and a plurality of threshold parameters from an input device are received. Second, the real time signals are compared to the threshold parameters to determine if the streamer cables should be repositioned. Finally, the streamer cables are repositioned when the real time signals exceed the threshold parameters.

DESCRIPTION OF THE PREFERRED EMBODIMENT

Figure 1:
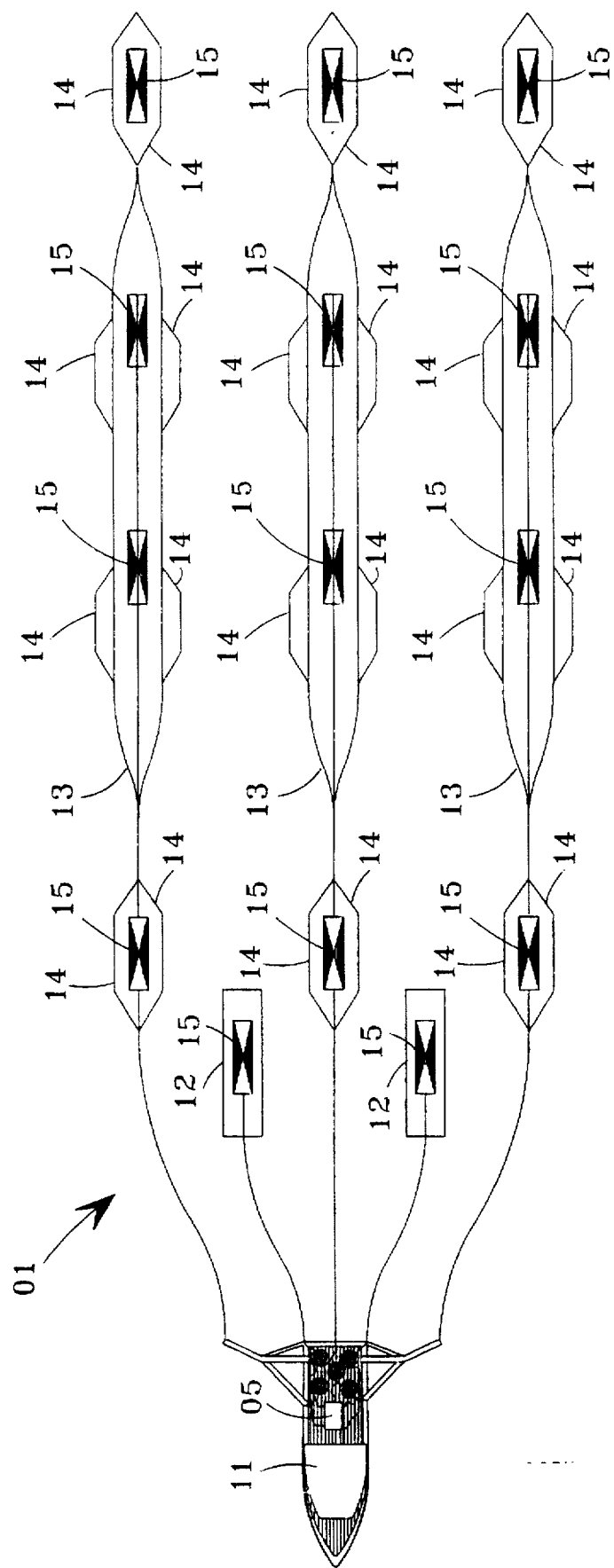
FIG. 1 shows a generalized schematic of a marine seismic survey system.

FIG. 1 illustrates a generalized schematic of a type of marine seismic survey system 01. This system 01 has a vessel 11, a plurality of seismic sources 12 and a plurality of streamer cables 13 under tow behind the vessel 11, and a marine seismic data acquisition system 05, which is onboard the vessel 11 and connected to the seismic sources 12 and the streamer cables 13. The seismic sources 12 generate seismic pressure waves. Hydrophones (not shown) in the streamer cable 13 receive pressure wave signals and send them to the marine seismic data acquisition system 05. The marine seismic data acquisition system 05 records pressure wave signals received from the streamer cable 13, controls the seismic sources 12 and the streamer cables 13, and monitors the seismic sources 12, the streamer cables 13, and the acquisition of subsurface seismic coverage.

As known to those skilled in the art, streamer positioning devices 14, for example birds and tail buoys, may be attached to the exterior of the streamer cables 13 for adjusting the vertical and lateral positions of the streamer cables 13. The streamer cables 13 include electrical or optical cables for connecting the streamer positioning devices 14 to individual control and logging systems, for each type of device, in the marine seismic data acquisition system 05. Typically, location sensing devices 15 may be used for observing the position of the streamer cables 13 and seismic sources 12. The marine seismic data acquisition system 05 uses these position observations to determine the position of the streamer cables 13 and seismic sources 12. As known to those skilled in the art, the location sensing devices 15 are connected to the marine seismic data acquisition system 05 by electrical or optical cables within the streamer cables 13 or by radio transmitter means.

Figure 2:
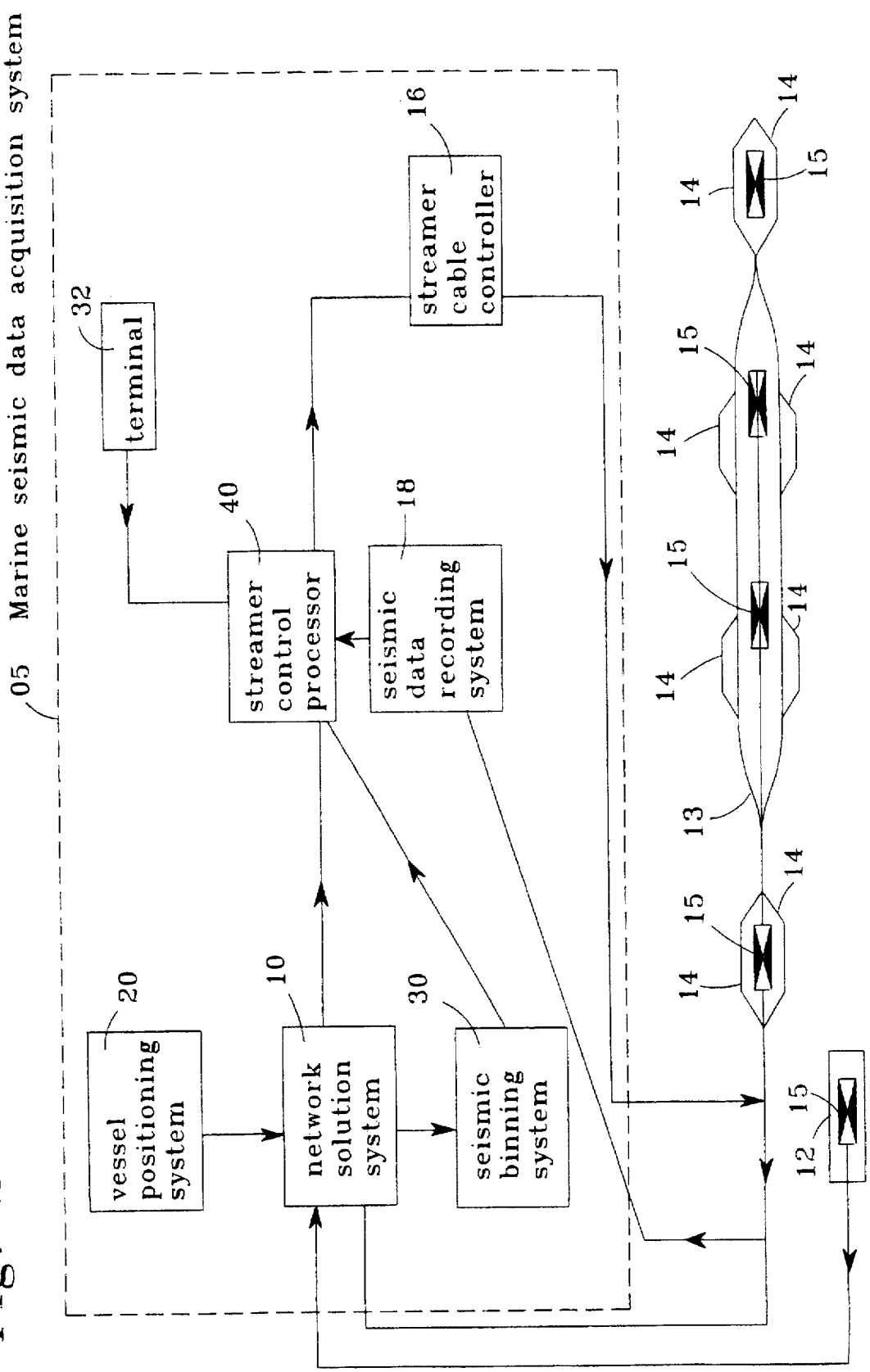
FIG. 2 shows a block diagram of a marine seismic data acquisition system in the improved system for controlling the position and shape of marine seismic streamer cables.

Referring now to FIG. 2, the interrelationship of the devices in the marine seismic data acquisition system 05 of the preferred embodiment of the present invention is shown. As known to those skilled in the art, components of the marine seismic data acquisition system 05, on the vessel 11, may include a vessel positioning system 20 for determining the position of the vessel 11 by satellite navigation, a seismic data recording system 18 for recording signals received from hydrophones in the streamer cables 13, a seismic binning system 30 for determining the subsurface seismic coverage during the seismic survey, a network solution system 10 for determining the position of the streamer cables 13 and seismic sources 12, and a streamer cable controller 16 for controlling the streamer positioning devices 14. (For clarity, only one streamer cable 13 and one seismic source 12 are shown in FIG. 2).

Typically, the network solution system 10 implements a Kalman filter solution on the signals it receives from the vessel positioning system 20 and location sensing devices 15. The network solution system 10 outputs real time streamer cable shapes, streamer cable positions, and streamer cable separations. The seismic binning system 30 receives these real time signals from the network solution system 10, and utilizes them to determine and output real time subsurface seismic coverage. The seismic data recording system 18 is connected to the streamer cables 13 and may output real time signals indicating whether or not the streamer cables 13 are recording seismic data and real time signals of hydrophone noise on the streamer cable 13.

In the present embodiment of the invention, the marine seismic data acquisition system 05 also includes a streamer control processor 40 for deciding when the streamer cables 13 should be repositioned and for calculating a position correction to reposition the streamer cables 13. Also in the present embodiment of the invention, threshold parameters are established for determining when the streamer cables should be repositioned. Threshold parameters may include a plurality of values for: minimum allowable separations between streamer cables 13, minimum allowable subsurface seismic coverage, maximum allowable hydrophone noise levels, and minimum allowable separations between any streamer cable 13 and any obstructive hazard. A terminal 32 for entering threshold parameters is connected to the streamer control processor 40. Threshold parameters may be entered into the streamer control processor 40 before or contemporaneously with the acquisition of a marine seismic survey.

The streamer control processor 40 is connected to the network solution system 10, the seismic binning system 30, the streamer positioning control devices 14, and the seismic data recording system 18 and receives the real time signal outputs of these systems. The streamer control processor 40 evaluates these real time signals and the threshold parameters from the terminal 32 to determine when the streamer cables 13 need to be repositioned and to calculate the position correction required to keep the streamer cables 13 within the threshold parameters. The streamer control processor 40 is connected to the streamer device controller 16. When the streamer cables 13 need to be repositioned, the position correction is used by the streamer device controller 16 to adjust the streamer positioning devices 14 and reposition the streamer cables 13.

Figure 3:
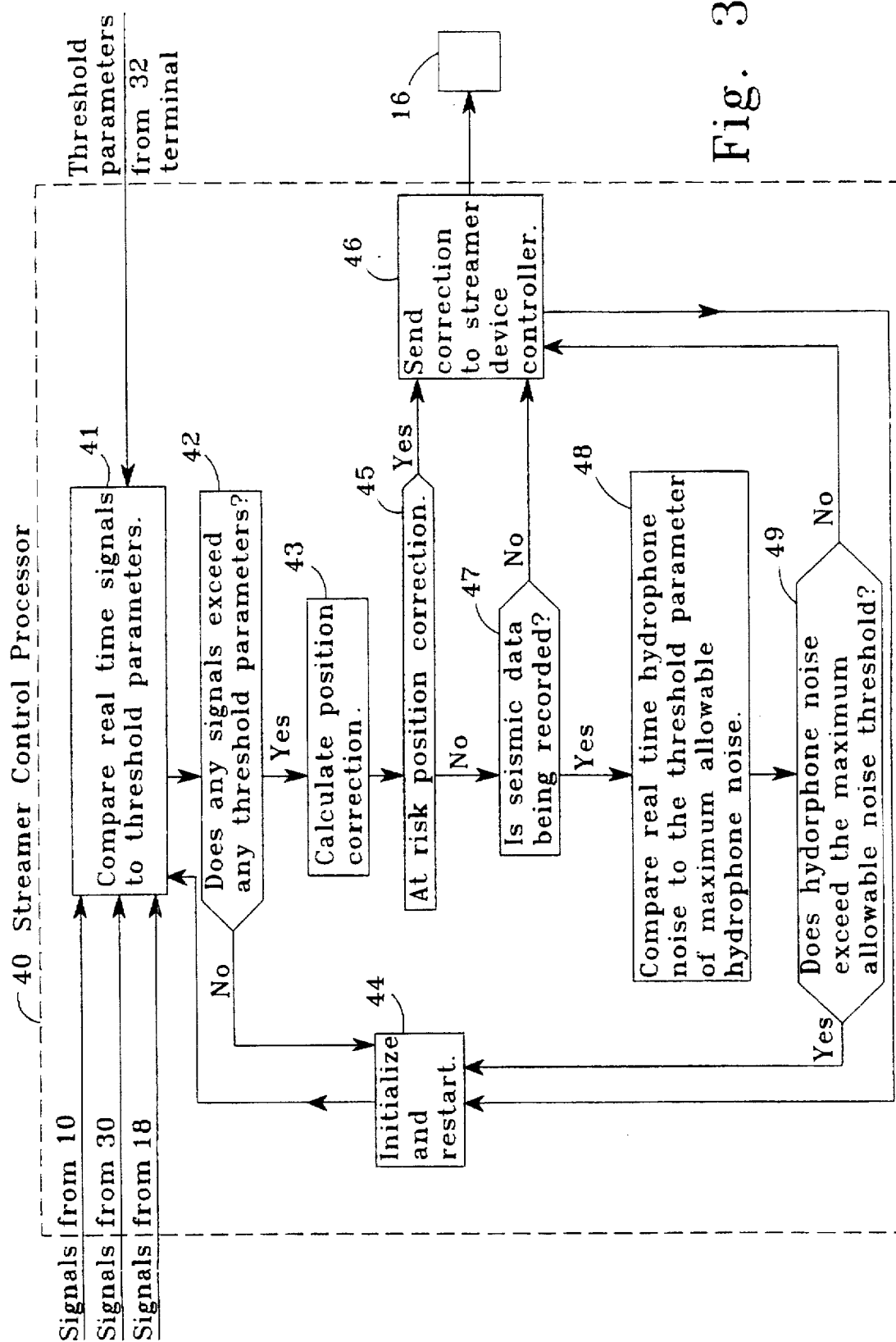
FIG. 3 shows a flow chart illustrating certain steps of a streamer control processor

Referring now to FIG. 3 and FIG. 2, the process steps of the streamer control processor 40 will now be described. At step 41, the streamer control processor 40 determines if the streamer cables 13 need to be repositioned by comparing the real time signals received from the network solution system 10, the seismic binning system 30, and the seismic data recording system 18 with the threshold parameters received from the terminal 32. At step 42, it is determined if any of the real time signals exceed any threshold parameter received from the terminal 32. At step 43, if any such threshold parameter is exceeded, a position correction is calculated that will reposition the streamer cables 13 back to within the threshold parameters. If no signal exceeds any threshold parameter, the streamer control processor 40 is initialized and restarted at step 44.

Since streamer positioning devices 14 create noise on hydrophones in the streamer cable 13, the present invention controls the use of the position correction by determining when the hydrophone noise level should prevent the repositioning of the streamer cable 13. Occasionally, towed streamer cables encounter "at risk" situations. For example, they face the possibility of becoming entangled with each other or of colliding with an obstructive hazard. When the streamer cables 13 are being repositioned to avoid such at risk situations the position correction should be implemented without considering the hydrophone noise levels.

At step 45, it is determined if the position correction is due to an at risk situation. If an at risk situation exists, at step 46 the streamer position correction is sent to the streamer device controller 16 for adjusting the streamer positioning devices 14 to reposition the streamer cables 13. If an at risk situation does not exist, at step 47 it is determined if the streamer cables 13 are being used to record seismic data by evaluating the real time signals and recorder status from the seismic data recording system 18. If the streamers cables 13 are not being used to record seismic data, at step 46 the streamer position correction is sent to the streamer device controller 16 for adjusting the streamer positioning devices 14 to reposition the streamer cables 13.

It is well known in the art of marine seismic data acquisition that hydrophone noise limits the resolution of marine seismic surveys. The preferred embodiment of the present invention constrains the repositioning of the streamer cables 13 by evaluating the hydrophone noise level of the streamer cables 13 when the streamer cables 13 are being used to record seismic data.

It is also well known in the art of marine seismic data acquisition that maximum allowable noise level thresholds may be established for marine seismic surveys and, when these thresholds are exceeded, data acquisition may be suspended or the affected portions of the surveys may have to be reacquired. Maximum allowable noise thresholds may be chosen in several ways. A single noise threshold, which is applied across the entire frequency spectrum of the seismic survey, may be chosen as the maximum allowable noise threshold. A weighted noise threshold, which varies and is applied as a function of the frequency spectrum of the seismic survey, may be chosen as the maximum allowable noise threshold. Also, measurements of background noise may be made on hydrophones in the streamer cables 13 and used to determine either the single noise or weighted noise thresholds.

At step 48, the control on the repositioning of the streamer cables 13, due to the level of hydrophone noise, is determined by comparing the real time signals of hydrophone noise from the seismic data recording system 18 with the threshold parameters of maximum allowable hydrophone noise. At step 49, it is determined if the real time signals of hydrophone noise from the seismic data recording system 18 exceed any threshold parameter of maximum allowable noise. If the real time hydrophone noise exceeds any threshold parameter of maximum allowable noise, at step 44 the streamer control processor 40 is initialized and restarted. If the real time hydrophone noise does not exceed any threshold parameter of maximum allowable hydrophone noise, at step 46 the streamer position correction is sent to the streamer device controller 16 for adjusting the streamer positioning devices 14 to reposition the streamer cables 13. After the position correction is sent to the streamer device controller 16 at step 46, the streamer control processor 40 is initialized and restarted at step 44.

What is claimed is:

1. A system for controlling the position and shape of marine seismic streamer cables, comprising the steps of:

receiving a plurality of real time signals, including hydrophone noise, from a marine seismic data acquisition system and a plurality of threshold parameters, including maximum allowable hydrophone noise, from an input device;

comparing the real time signals to the threshold parameters to determine if the streamer cables should be repositioned; and repositioning the streamer cables when the real time hydrophone noise signal is within the maximum allowable hydrophone noise threshold and when the remaining real time signals exceed the threshold parameters.

2. The system of claim 1, wherein the marine seismic data acquisition system further comprises:

a network solution system;

a seismic binning system; and a seismic data recording system.

3. The system of claim 2, wherein the repositioning step further comprises the steps of:

calculating a position correction that will keep the streamer cables within the threshold parameters; and sending the position correction to a streamer device controller for adjusting a plurality of streamer positioning devices.

4. The system of claim 3, wherein the receiving step further comprises the steps of:

receiving real time signals including streamer cable positions, streamer cable shapes, streamer cable separations, obstructive hazard positions, and subsurface seismic coverage; and receiving threshold parameters including minimum allowable separations between streamer cables, minimum allowable separations between any streamer cable and an obstructive hazard, and minimum allowable subsurface seismic coverage;

and the sending step further comprises the steps of:

determining if the streamer cables are in an at risk situation; and sending the position correction to the streamer device controller when the streamer cables are at risk.

5. The system of claim 4, wherein the receiving step further comprises the step of:

receiving real time signals including recorded seismic data; and the sending step further comprises the steps of:

determining if the streamer cables are in use for recording seismic data; and sending the position correction to the streamer device controller when the streamer cables are not in use for recording seismic data.

6. The system of claim 1, wherein the threshold parameter of maximum allowable hydrophone noise is a single noise threshold which is applied across the entire frequency spectrum of the seismic survey.

7. The system of claim 6, wherein the single noise threshold is determined from measurements of background noise made on the streamer cable.

8. The system of claim 1, wherein the threshold parameter of maximum allowable hydrophone noise is a weighted noise threshold which varies and is applied as a function of the frequency spectrum of the seismic survey.

9. The system of claim 8, wherein the weighted noise threshold is determined from measurements of background noise made on the streamer cable.

10. A system for controlling the position and shape of marine seismic streamer cables, comprising the steps of:

receiving a plurality of real time signals, including streamer cable positions, streamer cable shapes, streamer cable separations, obstructive hazard positions, subsurface seismic coverage, recorded seismic data and hydrophone noise, from a marine seismic data acquisition system;

receiving a plurality of threshold parameters, including minimum allowable separations between streamer cables, minimum allowable separations between any streamer cable and an obstructive hazard, minimum allowable subsurface seismic coverage and maximum allowable hydrophone noise, from an input device;

calculating a position correction that will keep the streamer cables within the threshold parameters;

determining if the streamer cables are in an at risk situation;

sending the position correction to a streamer device controller for adjusting a plurality of streamer positioning devices when the streamer cables are in an at risk situation;

determining if the streamer cables are in use for recording seismic data;

sending the position correction to the streamer device controller when the streamer cables are not in use for recording seismic data;

determining if the real time signals of hydrophone noise are within the threshold parameters of maximum allowable hydrophone noise; and sending the position correction to the streamer device controller when the real time hydrophone noise is within the maximum allowable hydrophone noise threshold.

* * * * *